United States Patent
Delbridge et al.

(10) Patent No.: US 10,684,213 B1
(45) Date of Patent: Jun. 16, 2020

(54) MEASUREMENT OF ION TRANSPORT ACROSS A COATING MEMBRANE

(71) Applicants: Jamaal D. Delbridge, Woodbridge, VA (US); Erick O. Satchell, Waldorf, MD (US)

(72) Inventors: Jamaal D. Delbridge, Woodbridge, VA (US); Erick O. Satchell, Waldorf, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 862 days.

(21) Appl. No.: 15/133,464

(22) Filed: Apr. 20, 2016

(51) Int. Cl.
  *G01N 17/02* (2006.01)
  *G01N 27/06* (2006.01)

(52) U.S. Cl.
  CPC ............ *G01N 17/02* (2013.01); *G01N 27/06* (2013.01)

(58) Field of Classification Search
  None
  See application file for complete search history.

(56) References Cited

U.S. PATENT DOCUMENTS

| | | |
|---|---|---|
| 6,611,151 B1 | 8/2003 | Ruedisueli et al. |
| 7,045,087 B2 | 5/2006 | Kotov |
| 7,972,515 B1 | 7/2011 | Mangum et al. |
| 8,093,908 B1 | 1/2012 | Smith, Jr. |
| 2001/0046564 A1 | 11/2001 | Kotov |
| 2003/0205526 A1* | 11/2003 | Vuong ............... B01D 61/022 210/652 |
| 2015/0165389 A1* | 6/2015 | McGinniss ......... B01D 61/002 523/457 |

OTHER PUBLICATIONS

John N. Murray, "Evaluation of Electrochemical Noise to Monitor Corrosion for Double Hull Applications," CARDIVNSWC-TR-61-94/29, Technical Report, Survivability, Structures, and Materials Directorate, Naval Surface Warfare Center, Carderock Division, Aug. 1994.

* cited by examiner

*Primary Examiner* — Jermele M Hollington
*Assistant Examiner* — Suresh K Rajaputra
(74) *Attorney, Agent, or Firm* — Howard Kaiser

(57) ABSTRACT

A freestanding coating membrane is fabricated and is tested for ionic transport. An adhesive liner is situated on a flat surface, paint is poured on the liner, a leveling blade is used to impart a uniform thickness to the uncured paint, the paint when completely cured is peeled from the liner, and the thickness of the resultant freestanding membrane is measured. Saline water is placed in an open-ended reservoir in communication with an assembly holding the freestanding membrane and containing deionized water. A pump causes water to circulate through the assembly via a conduit, which is connected at both ends to the assembly. The electrical conductivity of the circulating water is monitored for an appropriate duration for indication of salt concentration. The conductivity is initially low because the circulating water is originally deionized, and gradually increases commensurately with the amount of salt (e.g., chloride) ions passing through the membrane.

20 Claims, 7 Drawing Sheets

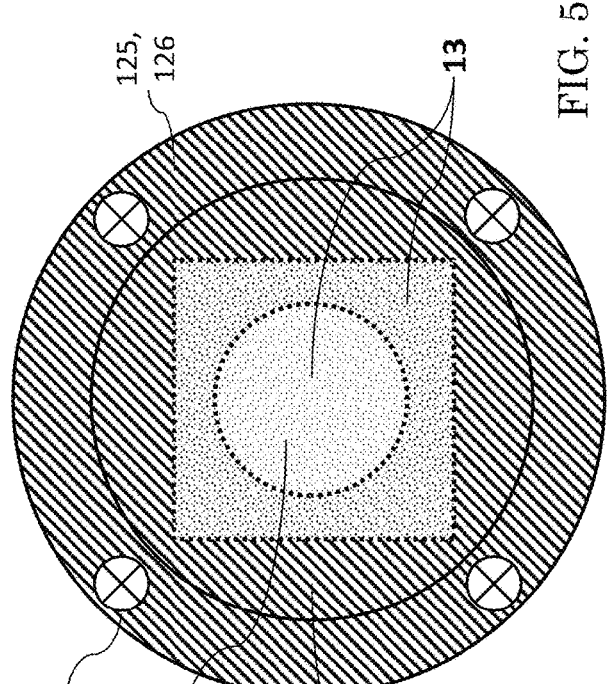
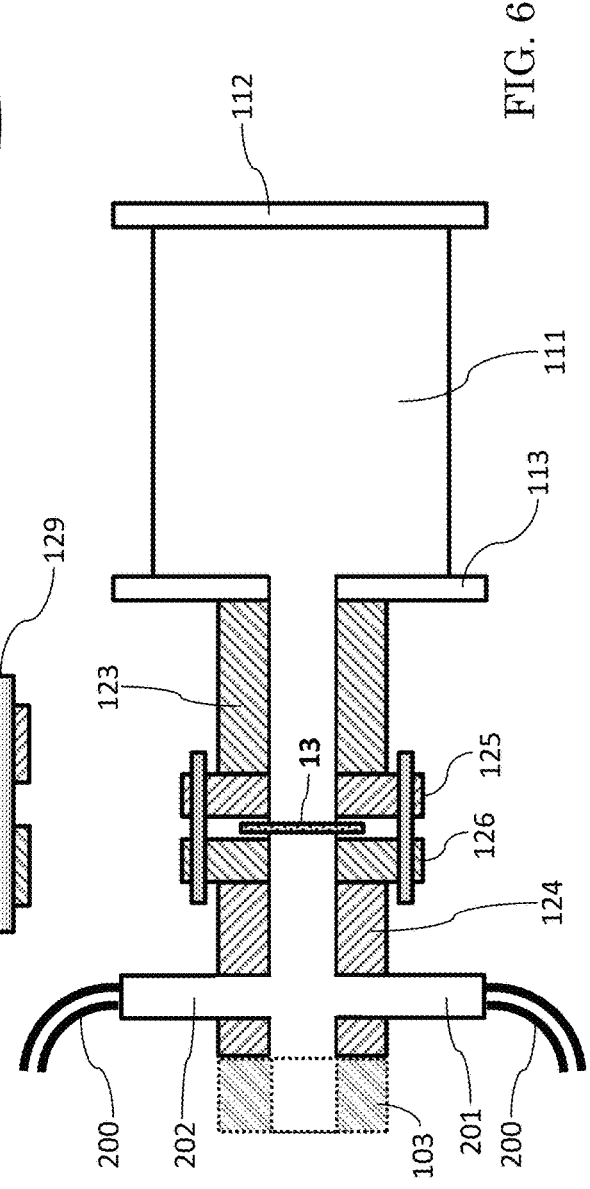

MEASUREMENT OF ION TRANSPORT ACROSS A COATING MEMBRANE

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to coatings, more particularly to methods and apparatuses for measuring passage of chloride ions across a coating such as a marine coating used to prevent or reduce corrosion of a ship hull or other vessel hull.

The present invention was motivated in part by the United States Navy's objective to develop a greater understanding of electrolyte ion kinetics through Navy marine coating systems. The Navy wishes to optimize the thicknesses of marine coating systems for aluminum substrates. Additionally, cost and weight reductions may be achieved by optimizing coatings for aluminum rather than steel substrates. Corrosion represents an enormous burden on the Fleet in terms of life cycle cost, availability, and reliability. Coatings are an integral part of the Navy's strategy to control corrosion.

Chloride ions and dissolved oxygen play distinctive roles in the corrosion of metal substrates. It is of great importance for corrosion mitigation technologies such as coatings to be able to protect a metal substrate from these ions and molecules. Coatings are vital to the Navy's continuing endeavor to prevent or reduce corrosion with respect to a variety of material substrates, coating functions, and service environments. Advancements in coatings may result from improved understanding of coating properties and functions, such as involving adhesion to a substrate, mechanical properties of a membrane, and barrier transport properties of a membrane.

The coating thickness requirements established by the Naval Sea Systems Command (NAVSEA) Standard Item 009-32 was developed for steel alloys. Steel substrates require 16-20 mils of coating for a typical coating system by this standard. However, some ship hulls (e.g., the Littoral Combat Ship (LCS) class) are made of aluminum alloys. Of particular interest to the Navy is the possibility that marine coating system thicknesses for aluminum substrates may be optimized by being decreased (e.g., in terms of mils) in comparison to marine coating system thicknesses for steel substrates.

Aluminum alloys have a passive layer that aids in its protection, where steels do not demonstrate passivity. Therefore, as it currently stands, NAVSEA Standard Item 009-32 may be overly conservative for aluminum substrates, as it has been optimized for steel substrates. Coatings aid in the protection of aluminum because aluminum alloys are subject to localized corrosion wherever the passive film fails. This is especially true in marine environments rich in chloride ions that attack the passive film and initiate pitting corrosion.

As evidenced by a dearth of pertinent information in the literature, coating thicknesses for optimal barrier properties against chloride and other ions have apparently not been thoroughly investigated. Conventional methods for testing marine coatings and their barrier properties are not entirely effective, as these methods involve testing of a coating that is situated on a substrate. Coatings barrier properties have traditionally been examined by electrochemical impedance spectroscopy (EIS). In the early 1990s, scientists such as J N. Murray examined barrier properties of coating systems using EIS.

For instance, Murray et al. mapped disbondment rates of coatings of variable thicknesses on steel to EIS parameters. The coating disbonded area was shown to increase with a decrease in coating thickness. However, no direct correlation of any specific species transport through the coatings was discussed in the literature. Transport rates of water and dissolved oxygen were mentioned as important but difficult to characterize due the interference of the steel substrate.

SUMMARY OF THE INVENTION

In view of the foregoing, an object of the present invention is to provide an improved methodology for measuring barrier properties of a coating.

An exemplary apparatus in accordance with the present invention measures transport of ions across a freestanding membrane. The exemplary inventive apparatus includes a reservoir, a holder-container unit, a pump, and a salinity measurement device such as including a conductivity meter. The reservoir contains salt water such as artificial seawater (e.g., ASTM D1141 artificial seawater); the salt water is characterized by $Na^+$ and $Cl^-$ ions. The holder-container unit contains deionized water and holds a freestanding coating membrane. The freestanding coating membrane is positioned between the artificial seawater and the deionized water, which are located on opposite sides of the freestanding membrane. The artificial seawater is contiguous to the freestanding membrane, and the deionized water is noncontiguous to the freestanding membrane.

In the exemplary inventive apparatus, the pump causes water to circulate whereby the deionized water initially constitutes the circulating water, and whereby the amount of chloride ions in the circulating water gradually increases in accordance with the introduction, into the circulating water, of the chloride ions that are transported across the freestanding membrane. A conductivity meter measures the amount of chloride ions in the circulating water. To facilitate the circulation of the water, the holder-container unit includes an inlet and an outlet and a conduit connected at opposite ends to the inlet and outlet.

The term "salt water," as used herein, broadly refers to water that contains (e.g., has dissolved therein) a significant amount or concentration of salt or salts. The present invention is frequently practiced whereby the salt water is artificial seawater.

The term "salinity measurement device," as used herein, broadly refers to a device that is capable of sensing at least one physical characteristic or phenomenon that is indicative of an amount or concentration of salt contained (e.g., dissolved) in a liquid substance such as water. The present invention is frequently practiced whereby a salinity measurement device includes an electrical conductivity meter.

Practice of the present invention may provide for a salinity measurement device that is capable of sensing salinity, electrical conductivity, temperature, density, specific gravity, and/or light refraction. For instance, depending on the inventive embodiment, an inventively implemented salinity measurement device may include a conductivity meter, a hydrometer, and/or a refractometer.

Organic coatings are the U.S. Navy's primary corrosion control mechanism for ships and other vessels. Coatings provide corrosion control through three primary mechanisms, viz., present barrier properties to ions and molecules that act as catalysts for corrosion processes, durable mechanical structure to ensure abrasion resistance, and long term performance. Prior to the present invention, it was not possible to measure barrier properties of a coating independent from the substrate. An exemplary inventive apparatus provides for controlled volumes of liquid on both sides of the membrane, and controlled sampling of the liquid. The inventive embodiment monitors transport, through coating membranes, of chloride ions and dissolved oxygen.

The present invention represents a novel methodology for performing ion transport measurements across a coating membrane independent of a surface in a manner that will enable optimization of membrane thicknesses for given substrates. Exemplary inventive practice enables determination of an optimal thickness of a coating system for a given substrate. Exemplary inventive practice tests freestanding thin film membranes independent of a substrate, and better understandings of barrier and mechanical properties of the substrate are thereby attained. Transport properties of Na+ and Cl− ions along with dissolved oxygen passing through a coating membrane are accurately measurable through exemplary inventive practice.

Exemplary practice of the present invention features, inter alia: (i) fabrication of intact coating system "free films" (films independent of a metal substrate) of specified composition, thickness, and cure; and, (ii) mounting of each of the fabricated free films in a test cell for measuring film transport properties. Exemplary inventive practice can accurately test, measure, and record changes in (i) conductivity, (ii) salinity, and (iii) dissolved oxygen passing through the freestanding thin film membrane coating in real time for long periods. According to usual inventive practice, the salinity is indicated by measurement of electrical conductivity.

An inventively determined optimal thickness of a coating system for an aluminum substrate will usually be less than the conventional thickness of a coating system applied to a steel substrate such as a ship hull. Cost and weight reductions may be achieved by the Navy by optimizing coating systems for aluminum substrates rather than steel substrates. By combining the advantages of weight reduction with permeability characterization, optimized coating systems for aluminum can be quantified. The present invention's method and system for quantitatively studying the impact of coating film thickness on the transport of ions and molecules may impart insight, for instance, into minimum coating film thicknesses that can protect ship hulls without compromising long-term service life.

Chloride ions and dissolved oxygen play distinctive roles in the corrosion of metal substrates. It is paramount for corrosion mitigation technologies such as coatings to be capable of protecting a metal substrate from these ions and molecules. Exemplary inventive practice includes testing of freestanding thin coating membrane films to define and characterize barrier properties. The present inventor has mainly focused on transport kinetics of ions (primarily Cl−, H+, and OH−) and dissolved oxygen through thin films.

Exemplary inventive practice can bring knowledge of coating barrier properties independent of adhesion properties. An exemplary membrane test apparatus in accordance with the present provides for a "freestanding" coating membrane, thereby determining barrier properties independent of any substrate. Exemplary inventive embodiments measure transport of ions and molecules across a coating membrane independent of a surface. The present invention can be practiced whereby quantitative diffusion and permeability constants are applied to freestanding coating films, and such terms are related to chemical and physical coating properties independent of interaction with the substrate. In addition, inventive practice may determine whether and how film properties such as free volume can be related to coating barrier properties.

The present inventors' goal to investigate electrolyte ion kinetics through Navy coating systems gave rise to the present invention. The present inventors sought to measure the corrosion-driving electrolyte transport properties of selected marine coatings in order to: (i) analyze composition changes at the interface between the coating and the metal surface; and, (ii) evaluate effectiveness of coatings as a long-term barrier membrane between a metal surface and the corrosive marine environment. The present inventors set out to gain knowledge of coating barrier properties independent of adhesion properties, with emphasis on quantification of water uptake and characterization of film properties with respect to diffusion, including impact of thickness, presence/absence of defects, and film free volume.

An inventive prototype was designed, made, and tested by the present inventors. The present inventors used their prototypical apparatus to test freestanding thin coating membrane films, especially to examine their barrier properties, transport properties, mechanical properties, and adhesion-to-substrate properties. The inventive prototype supported thin membranes and accommodated available instrumentation to measure transport rates of selected solution species across the membrane. The present inventors created free films of varying thicknesses. Samples of cured coatings of varying specified thicknesses were prepared and fashioned by the present inventors into membrane test specimens.

In accordance with this prototypical inventive practice, the membrane films were exposed to seawater environments. Artificial seawater (e.g., 950 ml-1000 mL) was placed on one side of a membrane, and de-ionized water (e.g., 50 mL-60 mL) was placed on the opposite side of the membrane. Each organic membrane specimen acted as the barrier between chambers of deaerated and buffered deionized water and aerated, synthetic seawater (e.g., pH=8.3). Membrane transport properties were monitored with respect to pH, temperature, conductivity, and dissolved oxygen over time. Samples were periodically taken and analyzed for chloride and other electrochemically active ion species.

When conductivity of the de-ionized water was monitored as a function of time, the conductivity was shown to correlate with coating membrane thickness. This inventive testing indicated that successive increments in coating membrane thickness nonlinearly decreased the coating membrane's permeability to ionic species. That is, a nonlinear relationship between the coating membrane thickness and measured test-cell conductivity was observed through inventive practice.

The present invention's novel system for testing trans-membrane transport affords capabilities not afforded by conventional systems. Conventional methods of testing marine coatings and associated barrier properties are deficient because of their inability to test coating membranes independent of the substrate. Exemplary inventive practice tests freestanding thin film membranes in order to examine and establish a better understanding of barrier properties and mechanical properties of coatings. For instance, the present invention can be practiced so as to accurately measure the transport properties of Na+ and Cl− ions, along with dissolved oxygen, passing through a coating membrane, with a view toward minimizing different types of corrosion.

With the benefit of fundamental knowledge gained through inventive practice, studies can be conducted on optimization of film chemistry, formulation, application, and cure conditions, and on correlation of barrier properties of coatings with known paint failure modes such as loss of adhesion, blistering, and coating service life. Improved coatings and coating service life may significantly reduce total ownership cost. Inventive practice may afford predictability of coating service life.

A greater understanding of coating service life may minimize costs associated with purchase and application of marine coatings for the Naval Fleet. Coating service life depends on barrier properties of the organic polymer film, adhesion of the polymer to a substrate, and ability of the coating to withstand damage. The present invention is practiced independently of the substrate and thus may advance understanding of diffusion of deleterious ions (e.g., Cl−) and dissolved oxygen through polymer films. Among the possible benefits of inventive practice, coating thicknesses may be reduced, paint qualification testing requirements may be modified, and paint formulations may be optimized.

BRIEF DESCRIPTION OF THE DRAWINGS

The present invention will now be described, by way of example, with reference to the accompanying figures, wherein:

FIG. 4, FIG. 5, and FIG. 6 are partial and enlarged views of various portions of the inventive membrane transfer testing device shown in FIG. 2.

DESCRIPTION OF EXEMPLARY EMBODIMENTS OF THE INVENTION

Figure 1:
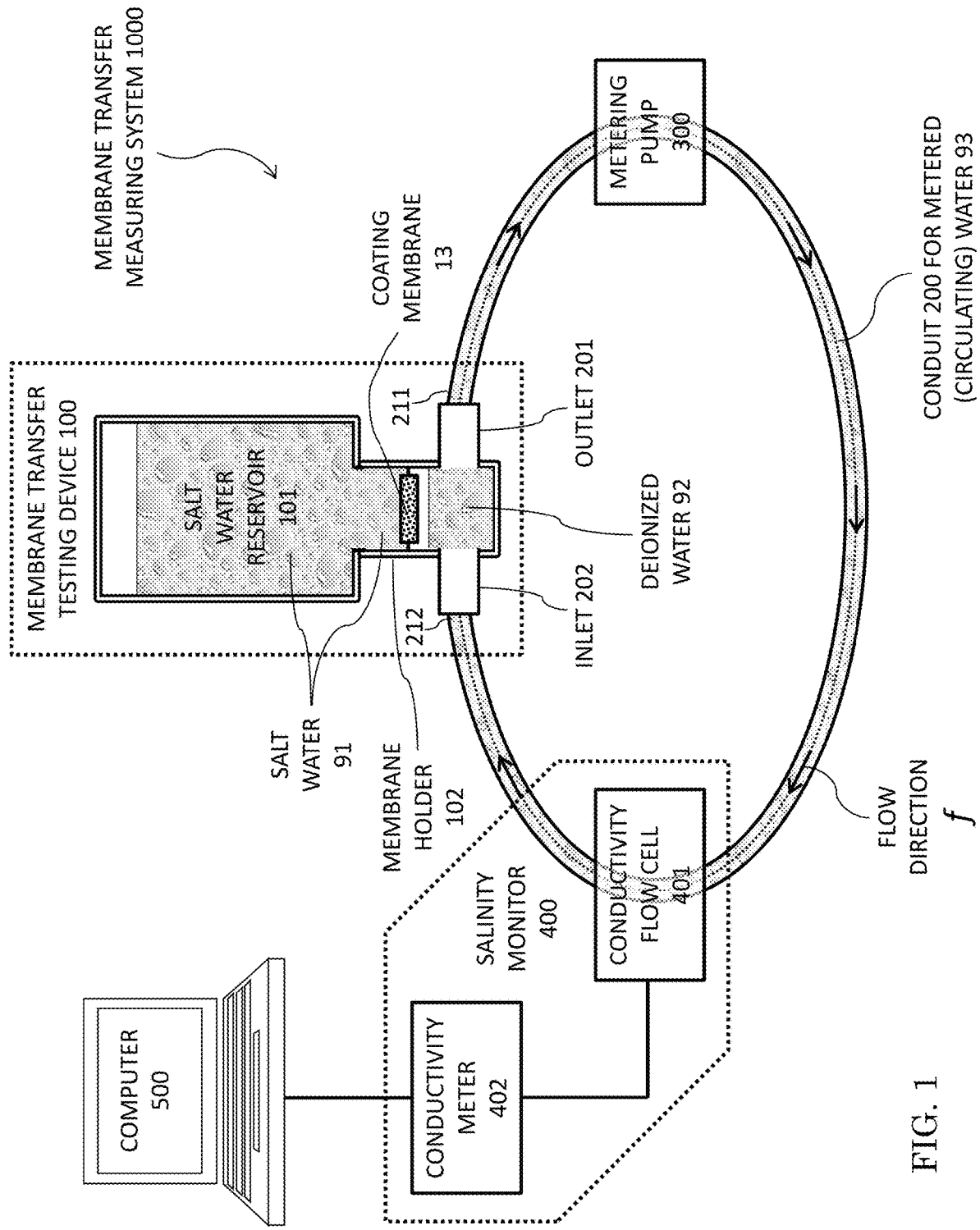
FIG. 1 is a schematic of an exemplary embodiment of a membrane transfer measuring system in accordance with the present invention.
Figure 2:
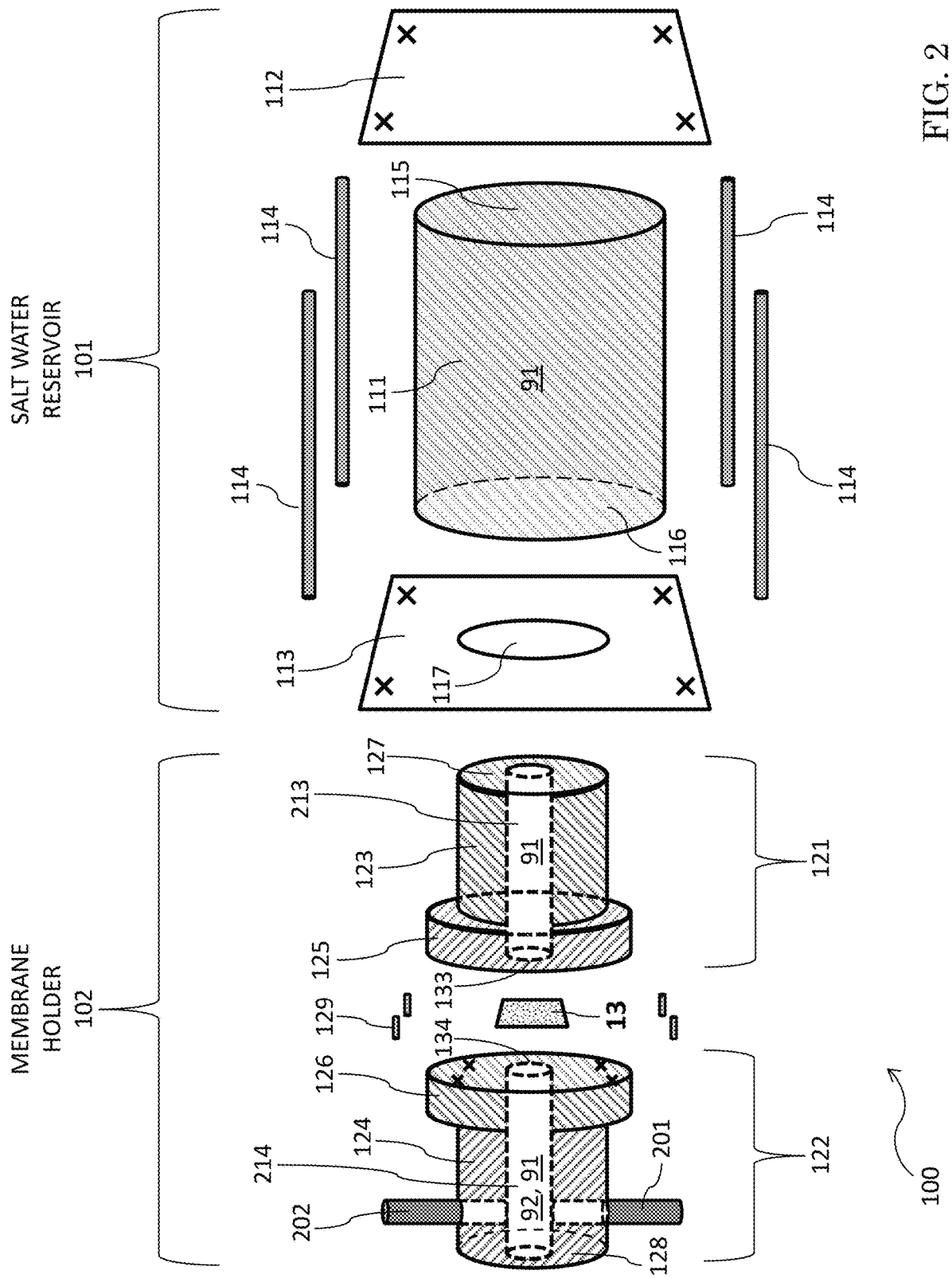
FIG. 2 is an exploded view of an exemplary embodiment of a membrane transfer testing device in accordance with the present invention, such as may be included in the inventive membrane transfer measuring system shown in FIG. 1.
Figure 3:
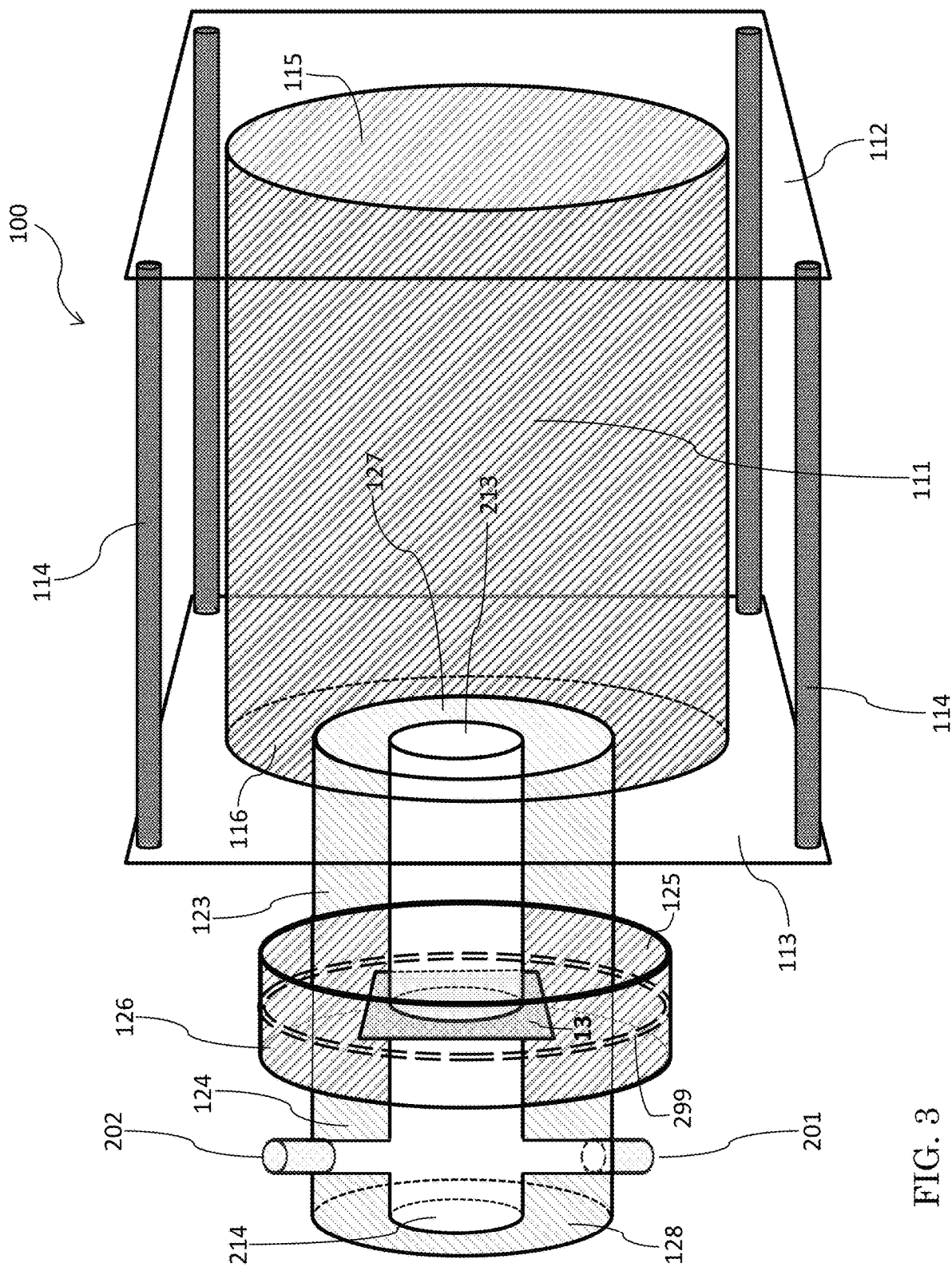
FIG. 3 is a perspective view of the inventive membrane transfer testing device shown in FIG. 2.
Figure 7:
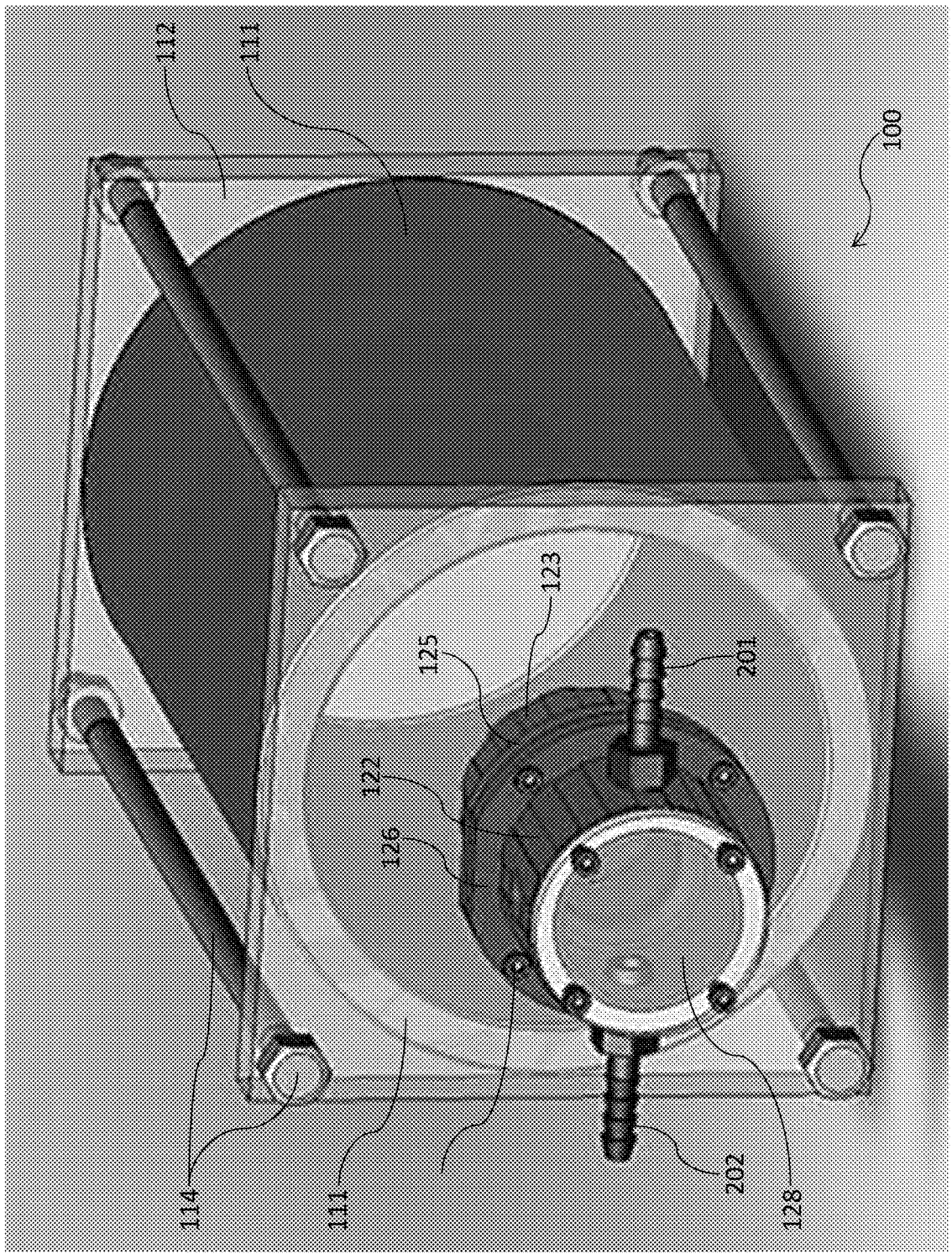
FIG. 7 is another perspective view of the inventive membrane transfer testing device shown in FIG. 2.

Referring now to FIG. 1, the present inventors fabricated and tested a prototype of a membrane transfer measuring system 1000 for measuring ion transport across a freestanding coating membrane 13. Inventive system 1000 includes a membrane transfer testing device 100, a conduit 200, a metering pump 300, a salinity measurement device (e.g., salinity monitor) 400, and a computer 500. As shown in FIG. 1, salinity measurement device 400 includes a conductivity flow cell 401 and a conductivity meter 402.

Inventive testing device 100 includes a saline solution reservoir 101 and a chambered membrane holder 102. A freestanding coating membrane 13 is held in place by and within membrane holder 102. Initially, reservoir 101 is partially filled with a quantity of artificial seawater 91, and chambered membrane holder is partially filled with a quantity of deionized water 92. One side of coating membrane 13 is adjacent to and in contact with the artificial seawater 91, and the opposite side of coating membrane 13 is proximate to but separated from the deionized water 92. Outlet 201 and inlet 202 are in fluidic communication via loop-around-configured conduit 200, which is connected at conduit end 211 to outlet 201 and is connected at conduit end 212 to inlet 202.

According to exemplary inventive practice, conductivity meter 402 is a measurement device that uses electrical conductivity of water to measure salinity of water. The more salts found in a water sample, the higher the conductivity of the water. A salinity monitor 400 includes conductivity flow cell 401 and conductivity meter 402. In an ongoing manner, metered water 93 flows out of outlet 201, through conduit 200, and into inlet 202. Metering pump 300 maintains a constant flow of metered water 93 in flow direction f. Conductivity flow cell 401 continually or periodically takes a sample of the circulating metered water 93, and this sample is measured by conductivity meter 402. Electrical conductivity measurement signals are transmitted by conductivity meter 402 and are received by computer 500, which collects, processes, and records the data.

According to this example of inventive practice, conductivity flow cell 401 captures a sample (portion) of metered water 93, and sends an electrical current through the water sample. Conductivity meter 402 measures how much the water sample resists the flow of electrical current. For instance, a product manufactured by YSI Incorporated of Yellow Springs, Ohio may be suitable for use as conductivity meter 402. Conductivity meter 402 and conductivity flow cell 401 together constitute an electronic circuit in which conductivity meter 402 processes a sensor signal generated by conductivity flow cell 401. A small current is passed through the small sample of water contained in conductivity flow cell 401. Conductivity meter 402 measures the water sample's resistance to the flow of electrons, thus determining the amount of current conducted by the water sample and hence the conductivity of the water sample.

Upon initial activation of metering pump 300, deionized water 92 constitutes all (or practically all) of the metered water 93 that flows (circulates) through conduit 200. In other words, the metered water 93 starts out as deionized water 92. The electrical conductivity of the circulating metered water 93 is continually measured via conductivity flow cell 401 and conductivity meter 402. Generally speaking, the amount of ionized substances (e.g., salts) dissolved in water determines the ability of the water to conduct electricity. Because the initial metered water 93 constitutes deionized water 92, the measured conductivity thereof will be very low. This initial value of electrical conductivity of the circulating metered water 93 will be minimal and will serve as a baseline for the ongoing conductivity measurement of the circulating metered water 93.

Instead of measuring the electrical conductivity of water, salinity measurement device 400 can be embodied to measure the specific gravity of water or the density of water. Instrumentation such as a hydrometer can be used to measure specific gravity or density of water and thereby indicate how much salt is present in the water, since most types of salt are denser than water. Alternatively, salinity measurement device 400 can be embodied to implement a refractometer (e.g., seawater refractometer) to measure refraction of light that passes between two mediums having different respective densities, such as from an air medium to a water medium.

With reference to FIGS. 2 through 7, an exemplary inventive embodiment of a membrane transfer testing device 100 includes a salt water reservoir 101 and a membrane holder 102. FIGS. 2-7 are representative of a test prototype fabricated and tested by the present inventors. Salt water reservoir 101 includes a receptacle 111, two endplates 112 and 113, and four fastening rods 114. Membrane holder 102 includes two major sections 121 and 122, which are designed to be coupled with each other so as to secure a coating membrane 13 closely situated therebetween.

Receptacle 111 is a cylinder having a first open cylindrical end 115 and a second open cylindrical end 116. Endplates 112 and 113 are tightly secured at cylindrical ends 115 and 116, respectively, using four fastening rods 114, which connect endplates 112 and 113. Endplate 112 is a continuous (closed or non-apertured) structure, whereas endplate 113 has an aperture 117 for watertight accommodation of the longitudinal portion 123 of membrane holder 102. Receptacle 111 and/or endplate 112 and/or endplate 113 can be transparent to facilitate monitoring of the internal contents (e.g., artificial seawater 91) of reservoir 101. Salt water reservoir 101 is contained in receptacle 111.

Membrane holder section 121 and membrane holder section 122 are congruous or similar, each section including two coaxial at least substantially cylindrical subsections. Membrane holder section 121 includes a longitudinal portion 123, a lip portion 125, and an axial fluid chamber 213 extending the entire length of membrane holder section 121. End 127 of membrane holder section 121 has a central opening to permit flow of artificial seawater 91 from receptacle 111 and through fluid chamber 213, coating membrane 13, and fluid chamber 214. The permeability of coating membrane 13 in terms of nature and degree of ions passing therethrough is an important inquiry in exemplary inventive practice. As illustrated in FIG. 4, coating membrane 13 is characterized by a thickness t.

Membrane holder section 122 includes a longitudinal portion 124, a lip portion 126, and an axial fluid chamber 214 extending the entire length of membrane holder section 122. Axial fluid chambers 213 and 214 are at least substantially cylindrical and are coaxial with their respective sections 121 and 122. Outlet valve 201 and inlet valve 202 each project from longitudinal portion 124 in communication with fluid chamber 214. According to exemplary inventive practice, longitudinal portion 124 of membrane holder section 122 has an end 128 that is closed. However, some inventive embodiments may provide for one or more auxiliary parts or components 103 that are connected to longitudinal portion 124 at an at least partially open end 128 and thereby permit flow of artificial seawater 91 therein so that one or more additional properties (e.g., dissolved oxygen (DO)) of the artificial seawater may be measured.

Each of the lip portions 125 and 126 is disk-shaped, having a larger diameter and a shorter axial length than its corresponding longitudinal portion 123 or 124. Four fasteners (e.g., nuts-and-bolts, or nuts-and-screws) 129 are used to closely attach membrane holder sections 121 and 122 to each other so as to hold a coating membrane 13 between their respective circular end surfaces 131 and 132. More specifically, fasteners 129 engage lip portions 125 and 126 to effect attachment of membrane holder sections 121 and 122.

Prior to attaching membrane holder sections 121 and 122 to each other, membrane 13 may be adhered to either lip 125's end surface 131 or lip 126's end surface 132 so as to entirely cover the opening 133 of fluid chamber 213 (if adhered to lip 125) or the opening 134 of fluid chamber 214 (if adhered to lip 126). The attachment of membrane holder sections 121 and 122 is effected so that: respective fluid chambers 213 and 214 are axially aligned; end surfaces 131 and 132 contiguously sandwich coating membrane 13 in a watertight manner; and, coating membrane 13 entirely covers the respective openings 133 and 134 of fluid chamber 213 and fluid chamber 214.

Figure 8:
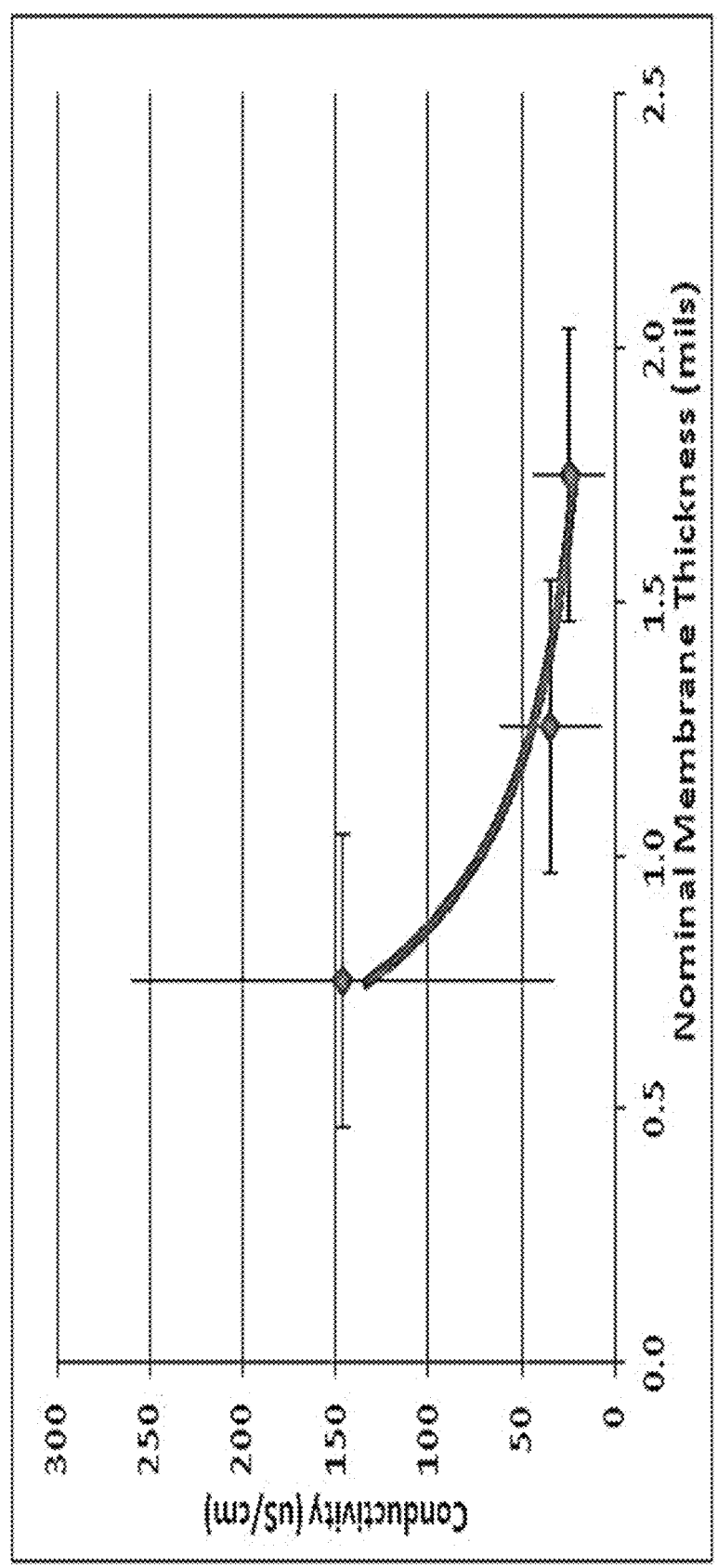
FIG. 8 is a graph showing a nonlinear relationship, determined through exemplary inventive practice, between the thickness of the freestanding membrane (mils) and the electric conductivity (µS/centimeter) of the originally deionized water.

FIG. 8 is a summary graph of the inverse relationship between the electrical conductivity of the metered solution 93 and the nominal thickness t of the coating membrane 13. Parameters of the testing included: a duration of 10,080 minutes (1 week); a artificial seawater 91 conductivity C=55 mS/cm (55000 µS/cm); coating membrane 13 thicknesses t in the range 1.0 mil<t≤2.0 mils; and, standard deviations for coating membrane 13 thicknesses t of 0.1111 mil. FIG. 8 shows a nonlinear relationship, determined through exemplary inventive practice, between the thickness t (mils) of the freestanding coating membrane 13 and the electric conductivity (µS/centimeter) of the metered water 93.

This nonlinear relationship between water electrical conductivity and coating membrane thickness was monitored as a function of time, and the water conductivity was demonstrated to correlate with the membrane thickness. A nonlinear relationship between coating membrane thickness and measured test-cell conductivity has thus been observed through inventive practice. The FIG. 8 graph illustrates that increase in membrane thickness t is associated with decrease in conductivity of the metered water 93. The conductivity of the metered water 93 is shown in FIG. 8 to be proportional to its ionization (e.g., salinity). This inventive testing indicates that successive increments in coating membrane thickness t nonlinearly decrease the coating membrane's permeability to ionic species.

Figure 9:
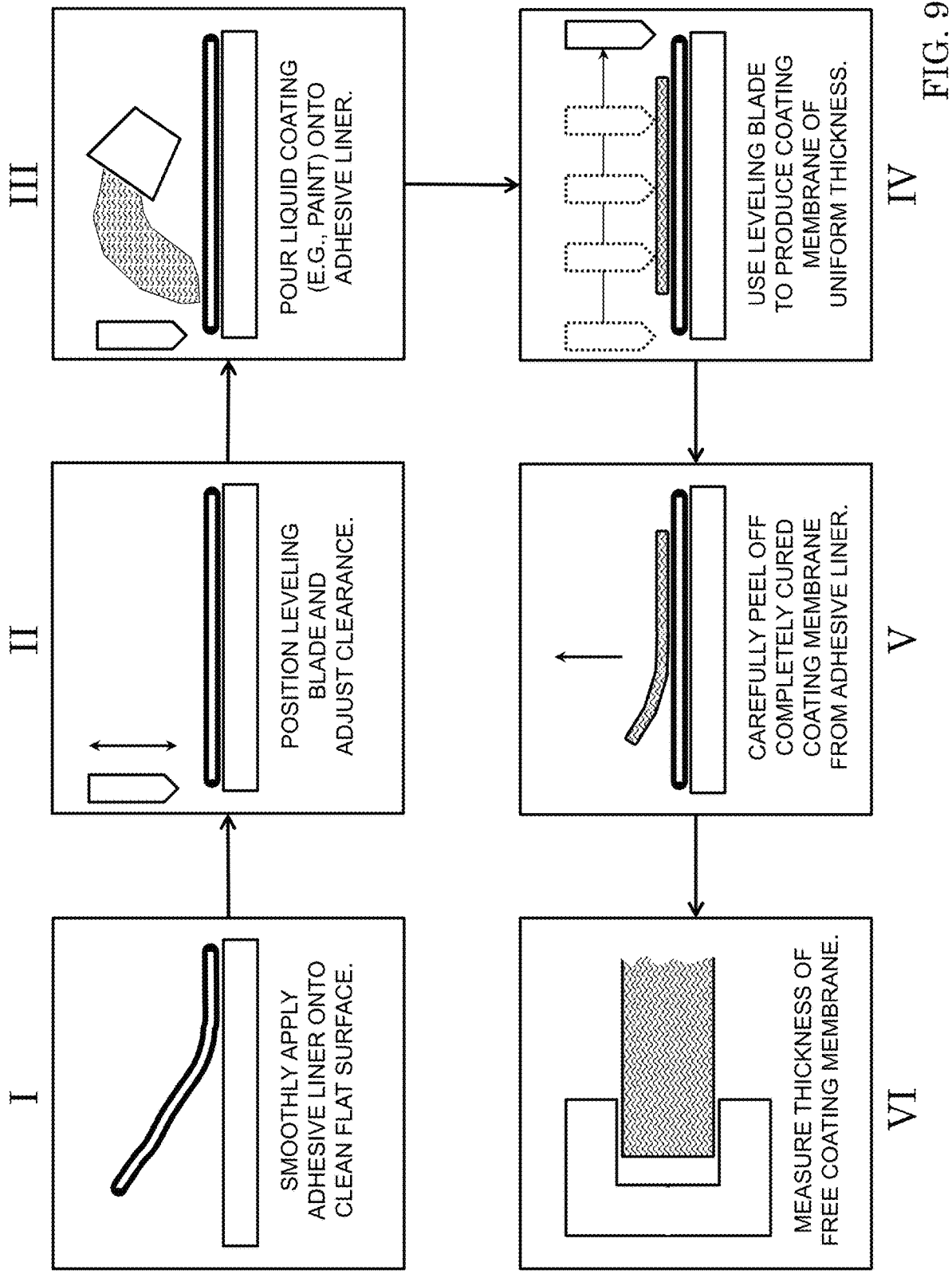
FIG. 9 is a flow diagram of an exemplary embodiment of a method for making a freestanding (stand-alone) coating a membrane in accordance with the present invention. The resultant membrane is independent of any substrate; that is, the membrane is not adhered to or otherwise coupled with any substrate.

With reference to FIG. 9 and as elaborated upon herein below, exemplary inventive practice provides for a step-by-step procedure for preparing a coating membrane 13 that is suitable for inventive measurement of ion transport across the coating membrane 13.

First, an adhesive liner is smoothly placed on a clean, smooth, planar table surface. The table and leveling blade (e.g., drawdown leveling blade) equipment should be cleaned (e.g., using acetone, if necessary) by removing all debris or residual paint that may be present on the tables surface and leveling blade due to previous usage. An adhesive liner (e.g., a smooth glazed sheet of paper such as SCOTCH 3M 568 positionable mounting adhesive) is smoothly adhered onto the table surface.

Second, the clearance is adjusted between the leveling blade and the upper surface of the adhesive liner. The gap between the drawdown equipment's blade and the adhesive liner top surface is adjusted to 2 mils, 4 mils, etc., as desired, for instance using appropriate NACE standard thickness shims. A pump may be associated with the table and activated such that the adhesive liner paper sits flat on the table without any formation of dimples.

Third, a quantity of well-stirred paint (e.g., a few milliliters such as 5 or 10 mL) is poured onto the adhesive liner and in front of the drawdown leveling blade.

Fourth, the leveling blade is carefully moved over the poured paint and toward the edge of the table so that the paint spreads uniformly over the adhesive liner sheet, preferably without formation of air bubbles. The drawdown equipment blade is carefully moved over the poured paint (which has just begun or will shortly begin to cure) and toward the edge of the table in such a way that the paint spreads uniformly over the adhesive liner sheet. This movement of the blade over the paint should be performed without trapping or otherwise forming any air bubbles. Smoothness of blade movement facilitates creation of a suitable even-thickness thin film of the paint on the adhesive liner. The thin paint film on the adhesive liner is allowed to cure (e.g., for 24-48 hours).

Fifth, the paint film is carefully separated from its substrate, i.e., the adhesive liner sheet. The separation of the paint film from the adhesive liner sheet should not be performed until the paint film has completely cured. In separating the film from the substrate, a free-film sheet should come off easily without getting torn. The peeling of the film off the substrate may be performed in a manner analogous to peeling off the back paper from a printed label.

Sixth, the overall thickness of the free-film is measured using a device such as a POSITECTOR, an electronic coating-thickness gage manufactured by DeFelsco Corp., Ogdensburg, N.Y. Several thickness measurements are taken at various locations on the film, both centrally and peripherally, and these thickness measurements are averaged to obtain overall thickness t of the free-film sheet. The free-film sheet is cut into "film strips," i.e., individual coating membrane portions 13 that are suitable for inventive implementation. For instance, using a pair of scissors, a free-film sheet can be cut into small sizes (e.g., about (2 inches by 2 inches) and stored a humidity-controlled laboratory chamber. Each "film strip" 13 is a membrane sample that is now ready to be used for membrane study in accordance with the present invention.

Prior to each test run using inventive measuring system 1000, inventive testing device 100 should be dismantled to ensure clean condition for next usage. In particular, reservoir 101 should be rinsed thoroughly several times with deionized water. Similarly, conductivity flow cell 401 (e.g., one that includes glass material for containing fluid) should be rinsed thoroughly several times with deionized water. All residual ions should be flushed out of reservoir 101 and conductivity flow cell 401. The practitioner of the present invention should make sure that there is no leakage in the setup of the inventive testing device 100. For instance, a screwdriver or an Allen wrench can be used to tighten the four screws/bolts of fasteners 129 in order to stop any leakage of electrolyte 91.

A coating membrane sample, viz., coating membrane 13, is applied either to the lip 125 end surface 131 of membrane holder section 121, or to the lip 126 end surface 132 of membrane holder section 122. The coating membrane 13 is moistened with deionized water and is then placed on the surface 131/132 so as to cover the hole or opening corresponding to axial fluid chamber 213/214. According to some inventive embodiments, it may be more efficient to adhere coating membrane 13 to membrane holder section 122's lip 126 end surface 132, and to then couple the membrane holder section 122 with the membrane holder section 121 using four fasteners 129, for instance four steel screws/bolts and matching nuts.

Sodium chloride solution (e.g., 3.5% weight NaCl solution), or another designated electrolyte, is introduced into reservoir 101. Circulating pump 300 is activated (e.g., switched on) to circulate the liquid. Initially, the deionized water 92 contained in fluid chamber 214 is circulated around and around through conduit 200; gradually, more and more of the artificial seawater 91 passes through coating membrane 13 and enters the circulating liquid stream. In a continuous loop, the circulating water 93 exits the fluid chamber 122 through the outlet 201, travels through the conduit 200 while being periodically sampled along the way by the conductivity flow cell 401, and enters the fluid chamber 122 through the inlet 200.

Accordingly, over time, conductivity meter 402 (which is connected to computer 500) will indicate a slow increase in electrical conductivity of circulating water 93. In an ongoing manner, conductivity measurements are taken by conductivity meter 402, and data is collected by computer 500. Exemplary inventive practice provides for running an experiment for at least a week or two to obtain sufficient conductivity data, with data analysis to follow.

According to some inventive embodiments, dissolved oxygen (DO) and/or pH measurements are also taken, for instance by inserting a DO probe and/or a pH probe for in a slot or other opening provided in membrane holder section 122 or in auxiliary unit 103. Depending on the inventive embodiment, the DO and pH readings can be processed such as via connection to computer 500, or can be recorded manually. Other modes of practice of the present invention are possible. For example, a free flowing conductivity probe can be associated with inventive testing device 100 and conductivity meter 402 so as to continuously sense conductivity in real time and output metric readings on the attached conductivity meter. In addition, added pressure can be induced to effect transport properties of salt ions.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. An apparatus for measuring transport of ions across a freestanding coating membrane, the apparatus comprising:
    a single freestanding membrane characterized by an at least substantially uniform thickness;
    a reservoir characterized by a reservoir opening, for containing salt water characterized by salt ions;
    a holder-container unit characterized by a holder-container opening, for containing deionized water and for holding said freestanding membrane in an at least substantially planar condition between said salt water and said deionized water on opposite sides of said freestanding membrane, said reservoir and said holder-container unit closely coupled wherein said reservoir opening and said holder-container opening adjoin and wherein said freestanding membrane is contiguous to said salt water and is noncontiguous to said deionized water;
    a pump for causing water to circulate whereby said circulating water initially consists of said deionized water and whereby the amount of said salt ions in said circulating water gradually increases in accordance with introduction, into said circulating water, of said salt ions that are transported across said freestanding membrane;
    a salinity measurement device for measuring an amount of said salt ions in said circulating water, wherein said amount of said salt ions in said circulating water decreases in accordance with increasing said thickness of said freestanding membrane.

2. The apparatus for measuring transport of ions as recited in claim 1, wherein said salt water is artificial seawater, and wherein the apparatus further comprises said artificial seawater and said deionized water.

3. The apparatus for measuring transport of ions as recited in claim 1, wherein:
said holder-container unit includes an inlet and an outlet each for communicating with said deionized water;
the apparatus further comprises a conduit connected at its opposite ends to said inlet and said outlet;
said inlet, said outlet, and said conduit are for facilitating said circulation of said water.

4. The apparatus for measuring transport of ions as recited in claim 3, wherein said salinity measurement device is capable of sensing at least one property of said circulating water selected from the group consisting of electrical conductivity, temperature, density, specific gravity, and salinity.

5. The apparatus for measuring transport of ions as recited in claim 3, wherein:
said salinity measurement device includes an electrical conductivity meter for measuring an electrical conductivity characterizing said circulating water;
said salt water is artificial seawater;
the apparatus further comprises said artificial seawater and said deionized water;
said electrical conductivity characterizing said circulating water increases in accordance with increasing said amount of said ions in said circulating water;
said electrical conductivity characterizing said circulating water decreases in accordance with increasing said thickness of said freestanding membrane.

6. The apparatus for measuring transport of ions as recited in claim 3, wherein said salinity measurement device includes:
a conductivity flow cell for obtaining samples of said circulating water;
a conductivity meter for measuring an electrical conductivity characterizing the obtained said samples of said circulating water;
wherein said electrical conductivity characterizing the obtained said samples of said circulating water decreases in accordance with increasing said thickness of said freestanding membrane.

7. The apparatus for measuring transport of ions as recited in claim 6, wherein said salt water is artificial seawater, and wherein the apparatus further comprises said artificial seawater and said deionized water.

8. A method for measuring transport of ions across a membrane, the method comprising:
providing a single freestanding membrane characterized by an at least substantially uniform thickness;
providing a reservoir characterized by a reservoir opening, for containing salt water characterized by salt ions;
providing a holder-container unit characterized by a holder-container opening, for containing deionized water and for holding said freestanding membrane;
introducing a quantity of said salt water into said reservoir;
introducing a quantity of said deionized water into said holder-container unit;
securing said freestanding membrane in an at least substantially planar condition in said holder-container unit;
closely coupling said reservoir and said holder-container unit, wherein said reservoir opening and said holder-container opening adjoin, wherein said freestanding membrane is situated between said salt water contained on a first side of said freestanding membrane and said deionized water contained on a second side of said freestanding membrane, wherein said freestanding membrane is in contact with said salt water and is separated from said deionized water;
causing water to circulate so that said circulating water originally is said deionized water and so that gradually salt ions from said salt water transport across said freestanding membrane and enter said circulating water;
at least once, measuring an amount of said salt ions in said circulating water, wherein said amount of said salt ions in said circulating water decreases in accordance with increasing said thickness of said freestanding membrane.

9. The method for measuring transport of ions as recited in claim 8 wherein said providing of said freestanding membrane includes making said freestanding membrane, and wherein said making of said freestanding membrane includes:
adhering a liner onto a flat surface;
pouring a coating on said liner when said coating is in a liquid state;
imparting a uniform thickness to said coating; and
peeling said coating from said liner when said coating is in a cured state.

10. The method for measuring transport of ions as recited in claim 9 wherein said liner is an adhesive liner, and wherein said imparting of said uniform thickness includes using a leveling blade.

11. The method for measuring transport of ions as recited in claim 10 wherein the method further comprises measuring a thickness of said freestanding membrane.

12. The method for measuring transport of ions as recited in claim 8 wherein said causing of said water to circulate includes using a pump.

13. The method for measuring transport of ions as recited in claim 8 wherein said salt water is artificial seawater, and wherein said measuring of said amount of said salt ions in said circulating water includes measuring at least one property of said circulating water selected from the group consisting of electrical conductivity, density, specific gravity, and refraction of light.

14. The method for measuring transport of ions as recited in claim 8, the method further comprising measuring said thickness of said freestanding membrane.

15. The method for measuring transport of ions as recited in claim 10, wherein:
said freestanding membrane is a first said freestanding membrane;
the method further comprises repeating at least once, with respect to at least a second said freestanding membrane, the steps of providing said single freestanding membrane, introducing said quantity of said salt water into said reservoir, introducing said quantity of said deionized water into said holder-container unit, securing said freestanding membrane in an at least substantially planar condition in said holder-container unit, coupling said reservoir and said holder-container unit, causing said water to circulate, measuring said amount of said salt ions in said circulating water, and measuring said thickness of said freestanding membrane.

16. The method for measuring transport of ions as recited in claim 15 wherein each said freestanding membrane is made of the same material and has a different said thickness, and wherein the method further comprises:
comparing (i) said amount of said salt ions corresponding to the first said freestanding membrane, and (ii) said amount of said salt ions corresponding to the second said freestanding membrane;

relating (i) the respective said thicknesses of said freestanding membranes, and (ii) the respective said amounts of said salt ions.

17. The method for measuring transport of ions as recited in claim 16 wherein said providing of said freestanding membrane includes making said freestanding membrane, and wherein said making of said freestanding membrane includes:

adhering an adhesive liner onto a flat surface;

pouring a coating on said adhesive liner when said coating is in a liquid state;

imparting a uniform thickness to said coating, wherein said imparting of said uniform thickness includes using a leveling blade; and peeling said coating from said liner when said coating is in a cured state.

18. A method for evaluating ionic permeability of a membrane, the method comprising:

introducing saline water into a first containment component;

positioning a single freestanding membrane within a second containment component wherein said freestanding membrane is fixed and has a generally planar configuration;

introducing deionized water into said second containment component;

joining said first containment component and said second containment component wherein said first containment component and said second containment component are in direct fluidic communication with each other, said saline water bordering upon said freestanding membrane so that salt ions are capable of permeating said freestanding membrane;

connecting a conduit to said second containment component, said conduit having two conduit ends and connected at both conduit ends to said second containment component;

circulating water through said conduit, wherein the circulated said water is initially said deionized water and becomes increasingly ionized over time in accordance with a concentration of said salt ions that permeate said freestanding membrane and enter said circulating water;

monitoring said circulated water, wherein said monitoring of said circulated water includes obtaining information with respect to at least one physical property indicative of said concentration of said salt ions in said circulating water.

19. The method for evaluating ionic permeability of a membrane as recited in claim 18, wherein said freestanding membrane is characterized by a generally uniform thickness, and wherein the method further comprises:

determining said thickness of said freestanding membrane;

analyzing the obtained said information, wherein said analyzing of the obtained said information includes relating said concentration of said salt ions in said circulating water to said thickness of said freestanding membrane.

20. The method for evaluating ionic permeability of a membrane as recited in claim 18, further comprising repeating at least once said steps of introducing said saline water, positioning said freestanding membrane, introducing said deionized water, joining said first containment component and said second containment component, connecting said conduit to said second containment component, circulating said water through said conduit, monitoring said circulated water, determining said thickness of said freestanding membrane, and analyzing the obtained said information, wherein each said repetition of said steps is performed with respect to a different said freestanding membrane.

\* \* \* \* \*